United States Patent
Joseph et al.

(10) Patent No.: US 11,061,904 B2
(45) Date of Patent: Jul. 13, 2021

(54) RESOURCE CONDITION CORRECTION USING INTELLIGENTLY CONFIGURED DASHBOARD WIDGETS

(71) Applicant: International Business Machines Corporation, Armonk, NY (US)

(72) Inventors: Bobby Joseph, New South Wales (AU); Mustansir Ali, New South Wales (AU)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 710 days.

(21) Appl. No.: 15/955,098

(22) Filed: Apr. 17, 2018

(65) Prior Publication Data

US 2019/0318026 A1 Oct. 17, 2019

(51) Int. Cl.
| | |
|---|---|
| G06F 16/2455 | (2019.01) |
| G06N 20/00 | (2019.01) |
| G06F 16/248 | (2019.01) |
| G06F 16/25 | (2019.01) |
| G06F 3/0482 | (2013.01) |

(52) U.S. Cl.
CPC ...... *G06F 16/24553* (2019.01); *G06F 16/248* (2019.01); *G06F 16/252* (2019.01); *G06N 20/00* (2019.01); *G06F 3/0482* (2013.01)

(58) Field of Classification Search
CPC ............. G06F 16/24553; G06F 16/248; G06F 16/252; G06F 3/0482; G06N 20/00
See application file for complete search history.

(56) References Cited

U.S. PATENT DOCUMENTS

| | | | |
|---|---|---|---|
| 7,996,783 | B2 | 8/2011 | Ramset et al. |
| 8,869,027 | B2 | 10/2014 | Louch et al. |
| 9,582,171 | B2 | 2/2017 | Pourshahid |
| 2017/0140071 | A1 | 5/2017 | Coates et al. |
| 2018/0052574 | A1* | 2/2018 | Wolfe .................. G06T 11/206 |
| 2019/0220153 | A1* | 7/2019 | Kidron ............. G06Q 10/06393 |

OTHER PUBLICATIONS

P. Mell, et al. "*The NIST Definition of Cloud Computing*", NIST Special Publication 800-145, Sep. 2011, Gaithersburg, MD.
A.L. Samuel "*Some Studies in Machine Learning Using the Game of Checkers*," IBM Journal, vol. 3, No. 3, Jul. 1959.

* cited by examiner

*Primary Examiner* — Apu M Mofiz
*Assistant Examiner* — Husam Turki Samara
(74) *Attorney, Agent, or Firm* — William Hartwell; George S. Blasiak; Heslin Rothenberg Farley & Mesiti PC

(57) ABSTRACT

Methods, computer program products, and systems are presented. The method computer program products, and systems can include, for instance: obtaining administrator user defined configuration data associating a certain dataset to a certain widget; examining historical matching data respecting past matches between a widget attribute of the certain widget and properties of the certain dataset; performing matching between the widget attribute of the widget and a dataset property of the dataset based on the examining historical matching data respecting past matches between a widget attribute of the certain widget and properties of the certain dataset, and running the certain widget in response to the performing matching to indicate at least one condition; and sending by a computing node a communication for correction of the at least one indicated condition.

20 Claims, 11 Drawing Sheets

US 11,061,904 B2

RESOURCE CONDITION CORRECTION USING INTELLIGENTLY CONFIGURED DASHBOARD WIDGETS

BACKGROUND

The present disclosure relates to artificial intelligence (AI) and particularly to a computer implemented system for implementing corrections to conditions in computer system resources.

Data structures have been employed for improving operation of computer systems. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed (Samuel).

SUMMARY

Shortcomings of the prior art are overcome, and additional advantages are provided, through the provision, in one aspect, of a method. The method can include, for example: obtaining administrator user defined configuration data associating a certain dataset to a certain widget, wherein the certain dataset specifies a plurality of conditions of one or more computer system resource and is provided by a management service running on an enterprise system having the one or more computer system resource; examining historical matching data respecting past matches between a widget attribute of the certain widget and properties of the certain dataset; performing matching between the widget attribute of the widget and a dataset property of the dataset based on the examining historical matching data respecting past matches between a widget attribute of the certain widget and properties of the certain dataset, and running the certain widget in response to the performing matching to indicate at least one condition of the plurality of conditions; and sending by a computing node a communication for correction of the at least one indicated condition.

In another aspect, a computer program product can be provided. The computer program product can include a computer readable storage medium readable by one or more processing circuit and storing instructions for execution by one or more processor for performing a method. The method can include, for example: obtaining administrator user defined configuration data associating a certain dataset to a certain widget, wherein the certain dataset specifies a plurality of conditions of one or more computer system resource and is provided by a management service running on an enterprise system having the one or more computer system resource; examining historical matching data respecting past matches between a widget attribute of the certain widget and properties of the certain dataset; performing matching between the widget attribute of the widget and a dataset property of the dataset based on the examining historical matching data respecting past matches between a widget attribute of the certain widget and properties of the certain dataset, and running the certain widget in response to the performing matching to indicate at least one condition of the plurality of conditions; and sending by a computing node a communication for correction of the at least one indicated condition.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining administrator user defined configuration data associating a certain dataset to a certain widget, wherein the certain dataset specifies a plurality of conditions of one or more computer system resource and is provided by a management service running on an enterprise system having the one or more computer system resource; examining historical matching data respecting past matches between a widget attribute of the certain widget and properties of the certain dataset; performing matching between the widget attribute of the widget and a dataset property of the dataset based on the examining historical matching data respecting past matches between a widget attribute of the certain widget and properties of the certain dataset, and running the certain widget in response to the performing matching to indicate at least one condition of the plurality of conditions; and sending by a computing node a communication for correction of the at least one indicated condition.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
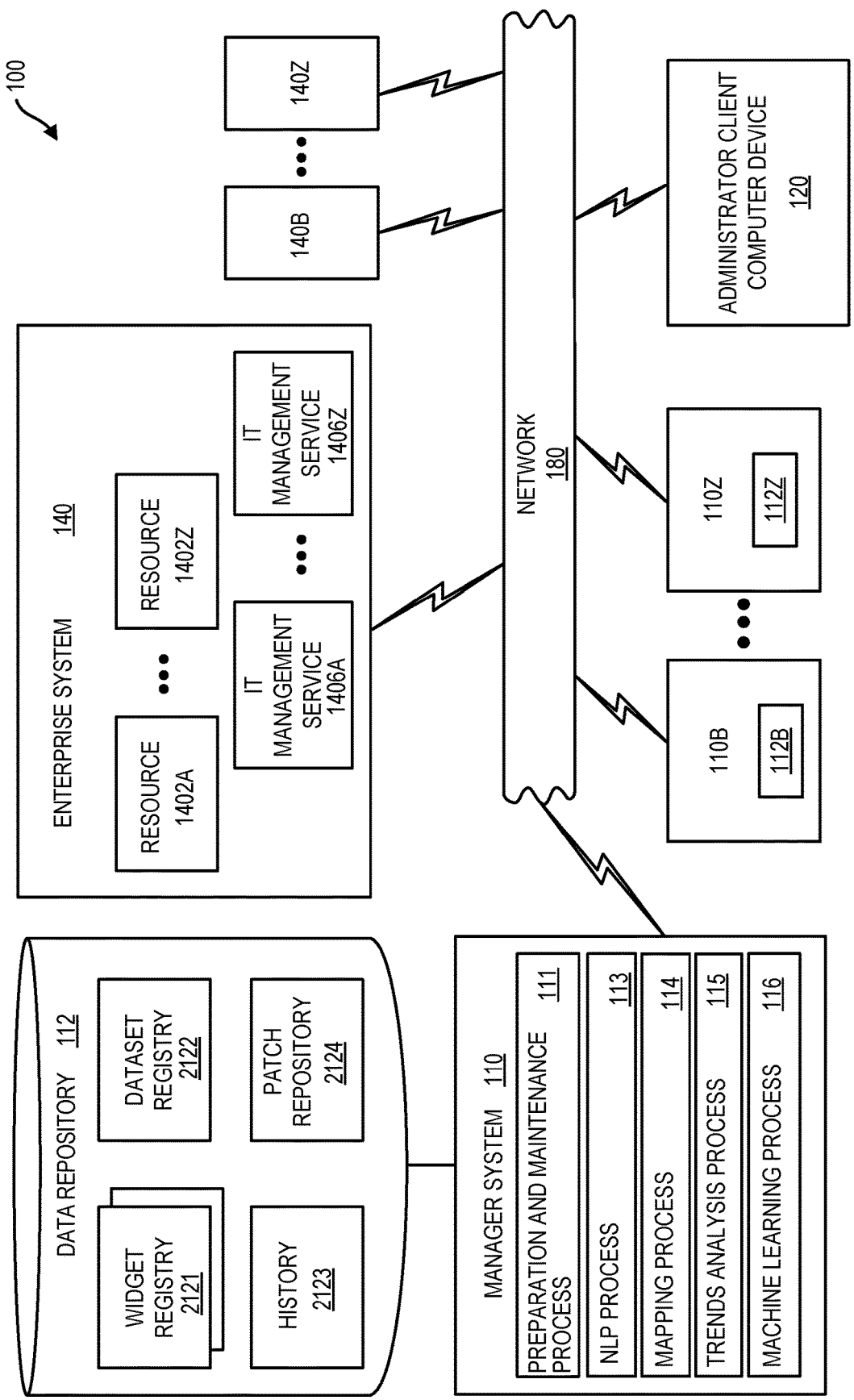
FIG. 1 depicts a system having a manager system and an enterprise system according to one embodiment.

System 100 for use in correcting conditions in computer system resources is shown in FIG. 1. System 100 in one embodiment can include manager system 110 having an associated data repository 112, enterprise system 140, and administrator client computer device 120. Manager system 110, enterprise system 140, and administrator client computer device 120 can be in communication with one another via network 180. System 100 can include numerous devices which may be computer node based devices connected by network 180. Network 180 may be a physical network and/or a virtual network. A physical network can be, for example, a physical telecommunications network connecting numerous computer nodes or systems, such as computer servers and computer clients. A virtual network can, for example, combine numerous physical networks or parts thereof into a logical virtual network. In another example, numerous virtual networks can be defined over a single physical network.

In one embodiment manager system 110 can be external to enterprise system 140 and administrator client computer device 120. In one embodiment manager system 110 can be co-located with enterprise system 140 and/or administrator client computer device 120.

In one embodiment system 100 can include second through Zth manager systems 110B-110Z each having an associated respective data repository 112B-112Z. In one embodiment system 100 can include second through Zth enterprise systems 140B-140Z.

In one embodiment, administrator client computer device 120 can be provided by e.g. a PC or a mobile computer device e.g. a smartphone having a small display.

In one embodiment, enterprise system 140 can be a computer system having resources 1402A-1402Z and Information Technology (IT) management services 1406A-1406Z. A resource of resources 1402A-1402Z can be provided e.g. by an application, a computing node, one or more program (e.g. system level or defining an application) and/or one or more component defining a computing node. Computing nodes can be, for example, configured as servers such as e.g. webservers, mail servers, application servers, database servers, real time communication servers, FTP servers, and/or collaboration servers. IT management services 1406A-1406Z can be implemented as web services. IT management services 1406A-1406Z of enterprise system 140 can run on computing node resources of resources 1402A-1402Z and/or dedicated computing nodes for running of one or more IT management service. IT management services 1406A-140Z can include IT management services of multiple different types. IT management services 1406A-1406Z can include, e.g. computer hardware, application utilization IT management services, system IT management services and/or alert services.

In one embodiment, a service of IT management services 1406A-1406Z can be provided by an application performance management (APM) IT management service. An APM IT management service can monitor and manage performance and availability of software applications. An APM can detect and diagnose complex application performance problems to maintain an expected level of service. One example of an application performance metric that can be tracked using an APM IT management service is an application average response time under peak load. An APM can also measure "computational resources" used by an application for a load, e.g. indicating whether there is adequate capacity to supported load as well as possible locations of performance bottlenecks. Response times for components of applications can be monitored to help identify causes of delay. An APM can include e.g. user experience monitoring, application run time, architecture discovery and modeling, user defined transaction profiling, e.g. business transaction management, application component monitoring, and reporting an application data analytics.

A service of IT management services 1406A-1406Z can include a system monitoring service that can monitor system level functionalities such as CPU usage and frequency, the amount of free RAM, space on one or more hard drive, CPU temperature, IP address utilization such as current rates of uploads and downloads, system up time and down time, voltages being provided by a power supply. One commercially available product for use in providing a subset of service monitoring functions is IBM® TIVOLI® monitoring production, available from International Business Machines Corporation (IBM and Tivoli are registered trademarks of International Business Machines Corporation).

A service of IT management services 1406A-1406Z can include alert services. Events that can be monitored for can include, e.g. overloading events, "auto memory events", VM migration events. An example of commercially available events services product is IBM® OMNIbus® available from International Business Machines Corporation (IBM and OMNIbus are registered trademarks of International Business Machines Corporation).

In one aspect as set forth herein manager system 110 can be configured to indicate conditions that are specified by data of different datasets, where the different datasets map to different ones of IT management services 1406A-1406Z. In one embodiment, manager system 110 can indicate conditions using data of multiple datasets simultaneously e.g. manager system 110 can display on a display screen defined by a display administrator client computer device 120 a dashboard that simultaneously indicates conditions specified by data of multiple datasets, where each dataset of the multiple datasets maps to one service of IT management services 1406A-1406Z.

Manager system 110 can run various processes including preparation and maintenance process 111, Natural Language Processing (NLP) process 113, mapping process 114, trends analysis process 115, and machine learning process 116. Data repository 112 can store various data in widgets area 2121 of data repository 112. Data repository 112 can store various visualization widgets which can include program code for facilitating presentations of various visualizations of data, including data obtained from enterprise system 140. In dataset registry 2122, data repository 112 can store descriptions of datasets which descriptions can be received iteratively from services of IT management services 1406A-1406Z of enterprise system 140. Data repository 112, in history area 2123 can store data on prior administrator user selections and can store data on prior mappings of widget attributes to dataset properties performed by system 100. Data repository 112 in patch repository 2124, can store various software patches for use in addressing diagnosed problems with computer networks that are diagnosed with use of system 100.

Manager system 110 can run a Natural Language Processing (NLP) process 113 for determining one or more NLP output parameter of a message. NLP process 113 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 113 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Manager system 110 can run mapping process 114 to map widget attributes to dataset properties. For performing mapping, manager system 110 running mapping process 114 can examine metadata of widgets of a widget with metadata of a dataset. The metadata can be pre-existing or can be custom added. Manager system 110 running mapping process 114 can perform matching based on examining of metadata indicating a data type of an attribute and metadata indicating a data type of a dataset property. Manager system 110 running mapping process 114 can perform matching by examining metadata indicating a name of a widget to metadata of a dataset indicating dataset properties. Manager system 110 running mapping process 114 can examine context metadata. Manager system 110 running mapping process 114 in one embodiment can run trends analysis process 115 and can perform mapping based on an output provided by trends analysis process 115.

Manager system 110 running trends analysis process 115 can examine data of history area 2123 of data repository 112, which area can include data on the history of prior mappings between widget attributes and dataset properties performed previously by system 100. Manager system 110 running trends analysis process 115 can return a set of candidate dataset properties for matching to a widget attribute. The returned set of candidate dataset properties for matching to a widget attribute can be predicted best performing candidate dataset properties. In one embodiment, the return candidate dataset properties can be returned using a scoring function. A scoring function can score candidate dataset properties based on weighted factors according to one embodiment.

Manager system 110 running machine learning process 116 can provide features such as history repository 2123 and artificial intelligence (AI) processing as set forth herein, e.g. by mapping process 114 and trends analysis process 115 so that decisions are returned by system 100 based on obtained data obtained by system 100 without system 100 being expressly programmed.

Data repository 112 in widget registry 2121 can store data describing various widgets and data defining the widgets. Widgets can include computer code for causing visualization of a particular form. Widgets can be configured to provide such visualizations as charts, graphs, geographical maps, gauges, and the like. Each widget can include one or more attribute. An administrator can author new widgets for inclusion in widgets area 2121. System 100 can be configured so that an administrator can add metadata to widgets that are stored in data repository 112. Metadata that can be added to a widget can include, e.g. metadata that indicates a data type of data of an attribute of a widget, a name of a widget, and context of a widget. A widget attribute can refer to a parameter required to produce a visualization A bar chart visualization widget for example can include two attributes: X axis parameters and Y axis parameters.

Data repository 112 in dataset registry 2122 can store data describing various datasets including dataset identifiers. Each dataset identifier can map to a different IT management services of IT management services 1406A-1406Z.

Data repository 112 in history area 2123 can store data on the history of mappings performed by system 100 between widget attributes and dataset properties. For a given mapping, a mapping that is provided can be, e.g. fully automatic (without manual selection features), or guided automatic (having a combination of automatic selection and automatic manual selection features), or fully manual (without automated selection features).

As an example of a fully automated mapping the described machine process can map a visualization widget attribute to a dataset property without presentment of a menu options to select from a reduced set of candidate dataset properties and without presentment of an option to override.

As an example of a fully manual mapping, a menu specifying an entire set of candidate dataset properties can be presented to a user without reduction of the full candidate set of option, and the user can manually select from the full set of options.

As an example of guided automatic selection a manual user selection of a mapping can be made after machine process filtering, wherein filtering is provided to filter out candidate dataset properties from a full set of dataset properties to reduce the candidate set. As another example of guided automatic selection a machine process can specify a certain dataset property to map to widget attribute by default but can present an administrator user an option to manually override the default selection.

History area 2123 of data repository 112 can store data on past widget attribute to dataset property mappings. A record for each mapping can specify, e.g. whether the mapping was fully automatic, fully manual, or guided automatic. Records of historical mappings in history area 2123 of data repository 112 can include metadata that specifies the context i.e. the manner in which the prior mapping was made, e.g. fully automatic, guided automatic, or fully manual. For mappings that are guided automatic, the metadata can further specify whether the guided automatic mapping resulted from manual selection from a reduced set of dataset property candidate options or resulted from a manual override of a determined default mapping.

Patch repository 2124 of data repository 112 can store a library of software patches that are available for selection by an administrator user in response to presentment of visualization produced using a visualization widget. With use of system 100, a visualization produced using a visualization widget can be presented e.g. on a display of an administrator client computer device 120, which based on the optimization of the widget with use of system 100 can depict a certain network problem of an enterprise, e.g. a security vulnerability or bug. A patch as set forth herein can include a piece of software designed to update a software program and/or supporting data to fix or improve the performance of the program and/or data. There can be stored in patch repository 2124 runbook data associated to one or more of the patches specifying runbooks for the one or more of the patches. A runbook can include procedures to begin, stop, supervise, and debug the system, including for installing an associated patch.

Figure 2:
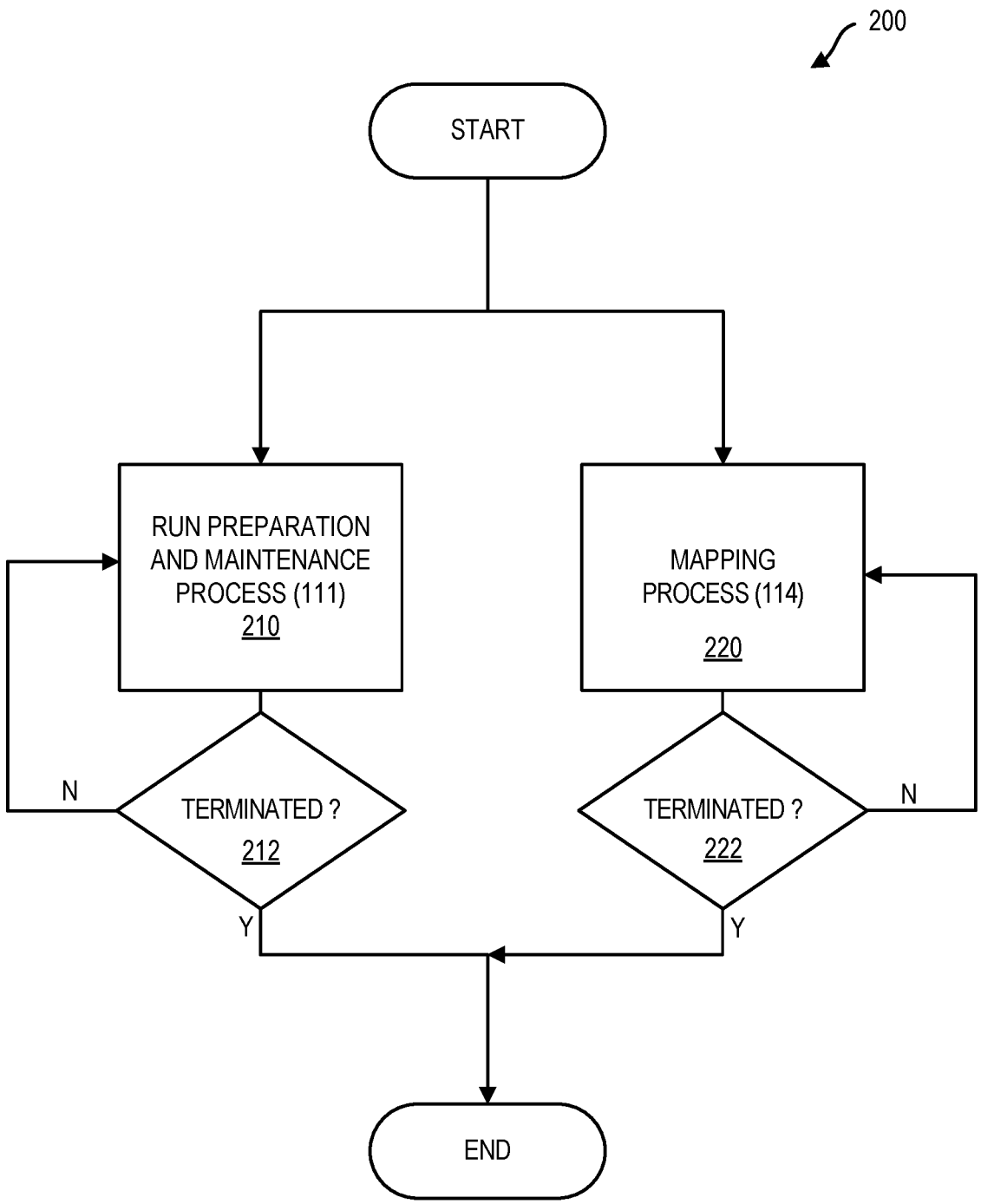
FIG. 2 is a flowchart illustrating a method for performance by a manager system according to one embodiment.

FIG. 2 is a flowchart illustrating coordination of processes that can be performed by manager system 110 of FIG. 1, in accordance with one or more embodiments set forth herein.

At block 210, manager system 110 can run preparation and maintenance process 111 to populate prepare and maintain various data of data repository 112 including data of locations areas 2121-2124. Manager system 110 can run preparation and maintenance process 111 iteratively until process 111 is terminated at block 212.

At block 220, manager system 110 can run mapping process 114 to intelligently select mappings between widget attributes and dataset properties. For support of running of mapping process 114 iteratively, manager system 110 can be running e.g. NLP process 113, trends analysis process 115 and/or machine learning process 116 iteratively. Manager system 110 can run mapping process 114 until mapping process 114 is terminated at block 222. Manager system 110 can run preparation and maintenance process 111 and mapping process 114 concurrently and can run each of process 111 and process 114 iteratively.

Figure 3:
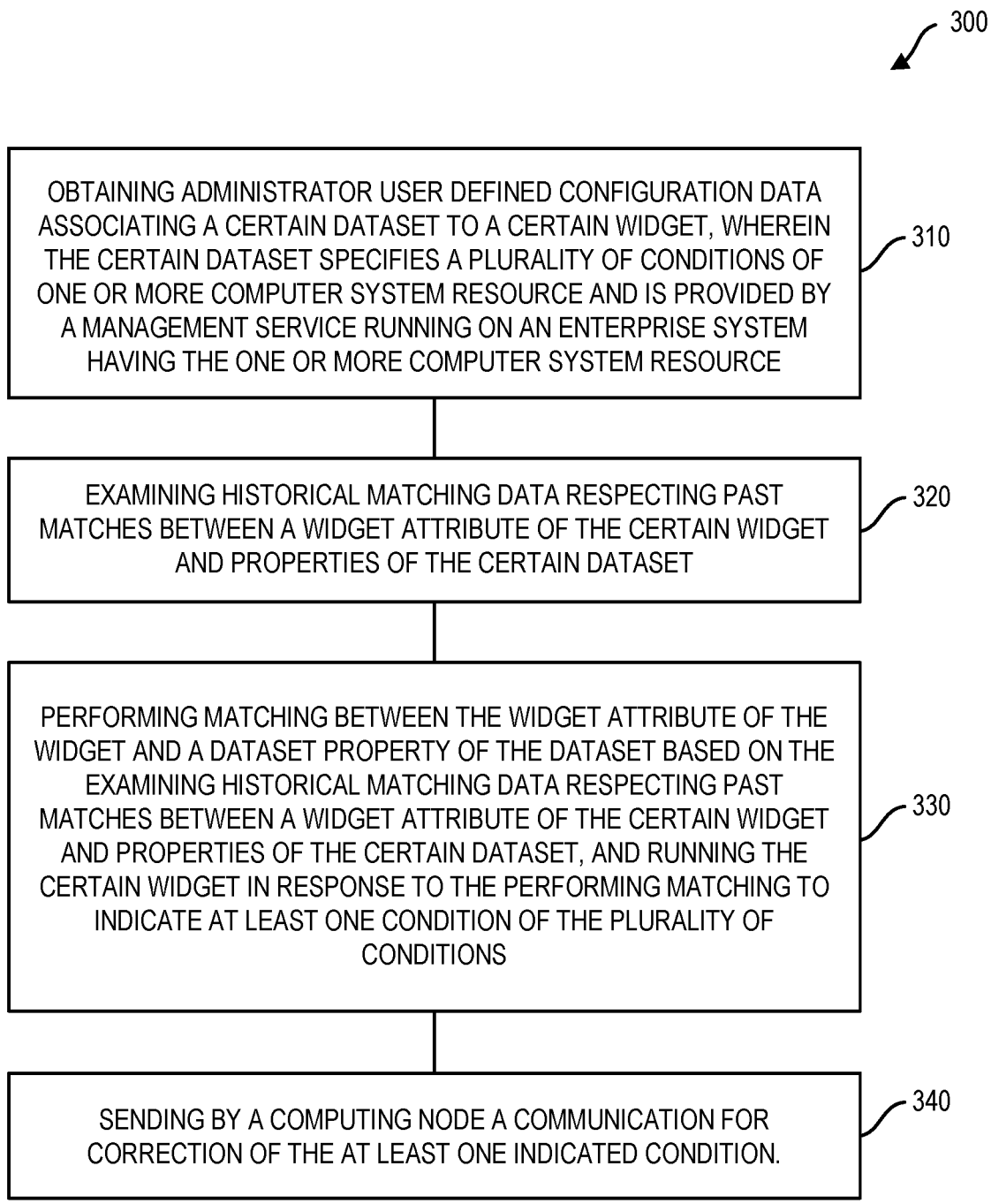
FIG. 3 is a flowchart illustrating a method for performance by a manager system according to one embodiment.

A method 300 for performance by manager system 110 in one embodiment is set forth in reference to the flow diagram of FIG. 3. At block 310 manager system 110 can perform obtaining administrator user defined configuration data associating a certain dataset to a certain widget, wherein the certain dataset specifies a plurality of conditions of one or more computer system resource and is provided by a management service running on an enterprise system having the one or more computer system resource. Manager system 110 at block 320 can perform examining historical matching data respecting past matches between a widget attribute of the certain widget and properties of the certain dataset. Manager system 110 at block 330 can perform matching between the widget attribute of the widget and a dataset property of the dataset based on the examining historical matching data respecting past matches between a widget attribute of the certain widget and properties of the certain dataset, and running the certain widget in response to the performing matching to indicate at least one condition of the plurality of conditions. Manager system 110 at block 340 can perform sending by a computing node a communication for correction of the at least one indicated condition.

An example of performance of method 300 is described with reference to the flowchart of FIG. 4 which depicts manager system 110 and its associated data repository 112 interacting with administrator client computer device 120, IT management services 1406A-1406Z, and resources 1402A-1402Z. At block 4061, IT management services 1406A-1406Z can be iteratively sending dataset registry data to manager system 110 for receipt by manager system 110 at block 1101. Manager system 110 at block 1102 can send dataset registry data for receipt by data repository 112 at block 1121 for storage in data repository into dataset registry 2122. Receiving and storing of dataset registry data by manager system 110 into data repository 112 can be iterative throughout a deployment time of system 100. Thus, dataset registry data may be iteratively received by manager system 110 throughout performance of subsequent blocks 1103-1110 by manager system 110. The dataset registry data can provide information on available datasets available for subjecting to condition indicating visualization.

Figure 5:
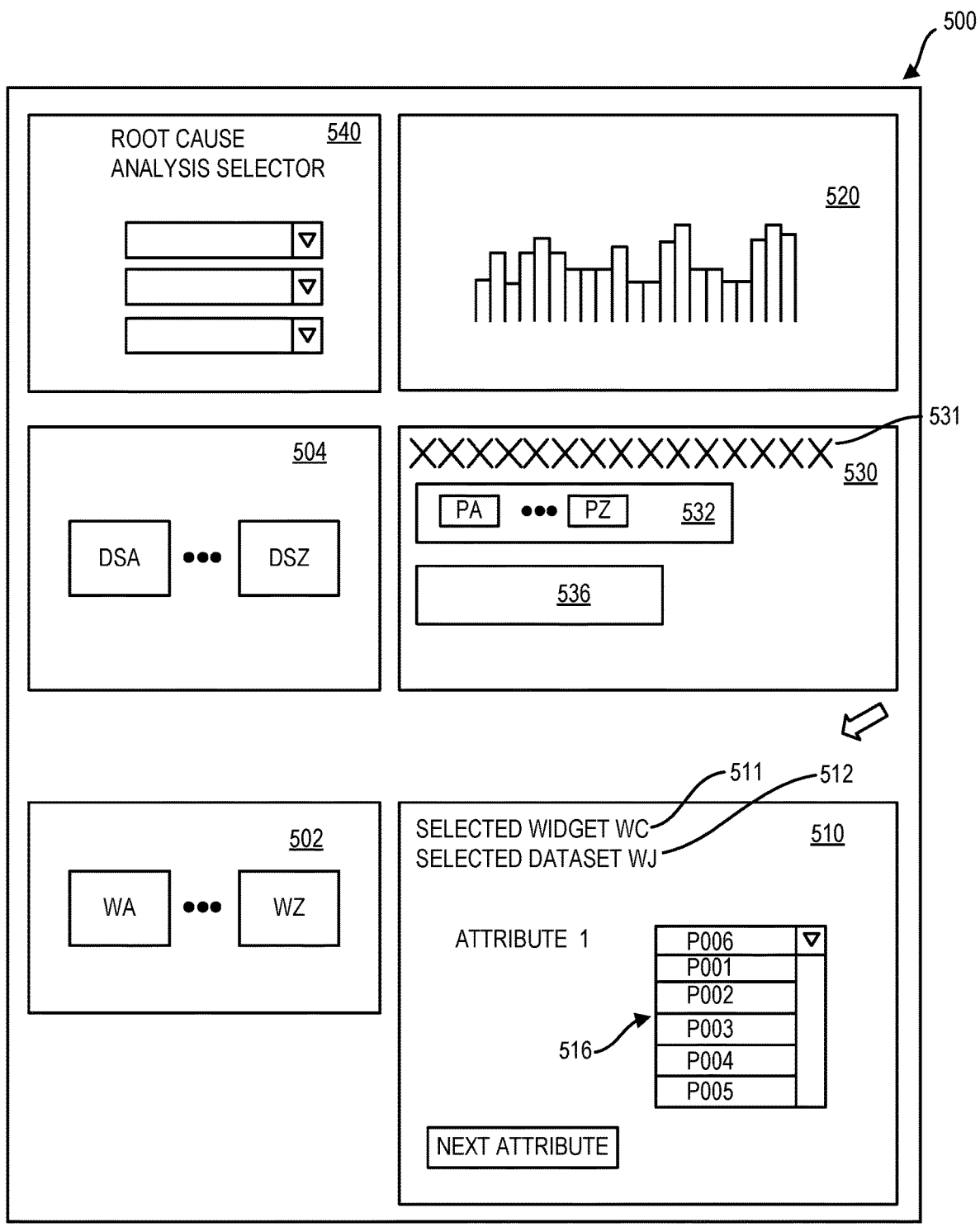
FIG. 5 depicts an administrator user interface according to one embodiment.

At block 1301 administrator client computer device 120 can send for receipt by manager system 110 at block 1103 administrator user defined configuration data associating a visualization widget and a dataset. An administrator user can configure widget and dataset selection data using an administrator user interface such as administrator user interface 500 as depicted in FIG. 5. Area 502 of administrator user interface 500 can include indicators WA-WZ for selection of different widgets by an administrator user. Area 504 can include indicators DSA-DSZ indicating different datasets for selection by an administrator user. An administrator user can select the visualization widget to specify a preferred form for a visualization, e.g. chart, graph, gauge, and the like and can select a dataset for visualization by the selected widget. Each dataset indication DSA-DSZ can map to one dataset of dataset registry 2122 of data repository 112 and can map to one IT management service of IT management services 1406A-1406Z.

Embodiments herein recognize that subsequent to a widget being associated dataset, time-consuming activities of an administrator user may remain prior to a desired visualization being produced for indication of condition of a computer system resource. In area 516 of administrator user interface 500 there can be displayed a set of identifiers for candidate dataset properties for mapping to a visualization widget attribute. Datasets provided by IT management services of IT management services 1406A-1406Z for receipt by manager system 110 for use in providing condition indication can include various schema. According to one common schema for a dataset, a dataset can include table data, i.e. can include columns and rows. Each of the datasets from the different IT management services 1406A-1406Z can include a different schema.

Datasets from IT management services 1406A-1406Z can have rows and columns. A column of a dataset as set forth herein can define a "property" of a dataset Embodiments herein recognize that where area displays a full (unfiltered and unreduced) set of candidate properties, tens or more identifiers can be displayed. The full list may not be capable of being simultaneously displayed on a display of an administrator client computer device, especially where administrator client computer device is a small screen mobile computer device. Datasets provided by a plurality of IT management services 1406A-1406Z can have widely variable schema. The differences may be attributable, e.g. to IT management services being utilized for multiple source providers and also multiple versions of IT management services being in use simultaneously. An administrator user may need to engage in significant research and training to understand the various schema and configuration options.

The setup time may pose unnecessary risk. In the time that widgets and a dataset are being subject to setup, a problem condition in a computer system resource of enterprise system 140 can go un-visualized and therefore unaddressed.

Embodiments herein also recognize that setup challenges can be increased were a small screen mobile client computer device is used and that administrator users are increasingly attending to servicing of network operations remotely via administrator client computer devices provided by mobile client computer devices. Embodiments herein recognize that such mobile client computer devices with small screens have limited ability to display configuration selection information. With small computer display screens, it may be practically impossible for an administrator user to configure a selected visualization widget to operate in accordance with a selected dataset for display of dataset data. Embodiments herein can include small screen mobile computer device user interface features including features to facilitate rapid configuration of condition indicating widgets for use in indicating conditions of computer system resources which conditions can include, e.g. conditions specifying application run time, CPU usage and/or memory utilization. Small screen mobile computer device user interface features can also include features to facilitate corrective action to correct indicated conditions of computer system resources. User interface features enhanced with use of intelligent configuration of widgets can improve the operation of administrator client computer devices 120 for use by administrator user, and such features can expand the ranks of users who may act as administrator users. For example, persons ordinarily classified as a business user may act as administrator users of system 100 with implementation of features herein for improved computer operation.

Figure 4:
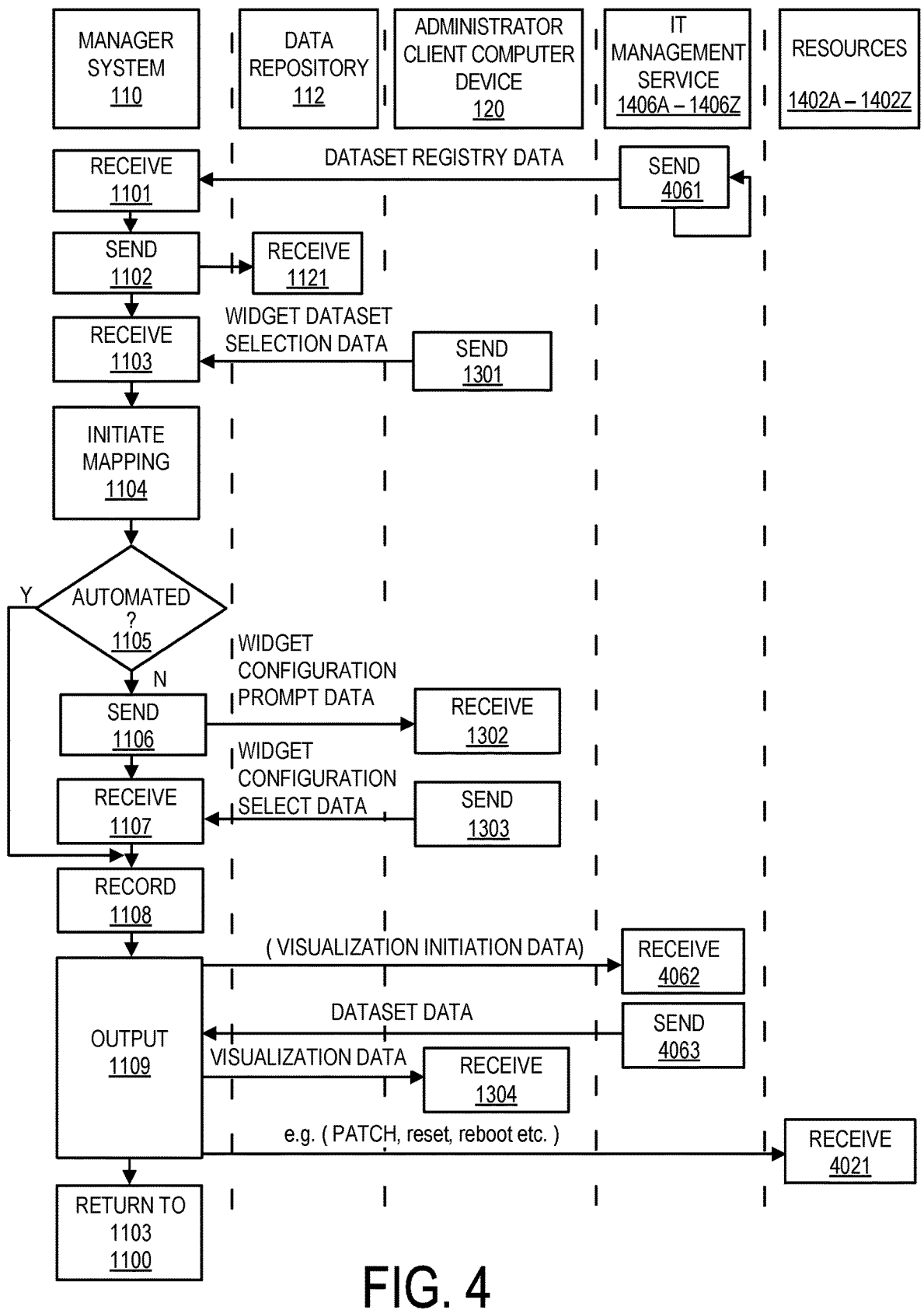
FIG. 4 is a flowchart illustrating a method for performance by a manager system interoperating with other components according to one embodiment.

Still referring to the flowchart of FIG. 4, manager system 110 at block 1104 can initiate mapping. Initiating mapping at block 1104 can include activating mapping process 114 as described with reference to FIG. 1, which can include activating trends analysis process 115, also explained with reference to FIG. 1.

As set forth herein, in reference to FIG. 5, mapping between visualization attributes and dataset properties can reduce time and complexities associated with setup of a visualization. With reference to administrator user interface 500 as shown in FIG. 5, area 516 depicts candidate dataset properties that can be associated to a visualization attribute so that visualization is performed according to a desired format. Area 516 can be within a configuration area 510 that allows an administrator to select mappings between visualization attributes and dataset properties. In area 511 an indicator for a currently selected widget can be displayed. At 512 an indicator for a currently selected dataset can be displayed. In area 516 candidate properties for a particular attribute can be displayed and candidate properties for each of a set of attributes for a certain widget can be displayed on an attribute for attribute basis. In one embodiment, area 516 can display a full set of candidate properties that might be associated to a particular widget attribute. Embodiments herein recognize that without any filtering of a full set of possible candidate properties, the burden on an administrator may be substantial and may not be practical for selection in a variety of instances, e.g. where an administrator is using a mobile device having a small screen. The selection of one candidate property of a full set of candidate properties may also be impractical, such a selection may require extreme, significant, and impractical to acquire knowledge of dataset schema or widget schema. Embodiments herein can reduce a number of options presented in area 516.

Embodiments herein accordingly alleviate problems notes so that widgets for visualizations can be rapidly deployed for quick visualization of computer network problems Running mapping process 114 (FIG. 1) which can include running trends analysis process 115 (FIG. 1) can result in one example in the fully automatic selection of a particular dataset property for a certain widget attribute (no manually entered input associated with the selection).

Running mapping process 114 (FIG. 1) which can include running trends analysis process 115 (FIG. 1) can result in one example in the guided automatic selection of a particular dataset property for a certain widget attribute. For example, running of mapping process 114 by manager system 110 can result in filtering so that a set of candidate dataset properties available for selection by an administrator user can be reduced and therefore simplified. Running of mapping process 114 (FIG. 1) according to guided automatic operation can guide a manual selection of a dataset property by a user for mapping with a widget attribute. In another example of an automatic guided manual selection, running of mapping process 114 can result in an automated mapping of a default selection wherein a certain default selection for mapping between a certain dataset property and a certain widget attribute is made but permits manual override of the automated default selection. The default selection may be automatically implemented in the absence of a manual override being made by an administrator user.

Referring again to the flowchart of FIG. 4, manager system 110 at block 1105 can determine whether there has been a fully automated mapping of a visualization attribute to a dataset property and if so, can proceed to block 1108 to record data specifying parameters of the mapping. In the case that a mapping performed by manager system 110 is not fully automated, e.g. is guided automated has only resulted in a filtering of candidate dataset property options or overriding of a default selection is facilitated, manager system 110 can proceed to block 1106.

At block 1106 manager system 110 can update administrator user interface 500 (FIG. 5) so that indicators of candidate dataset properties are updated in area 516, e.g. to implement a filtering wherein the number of possible candidate dataset properties is reduced. Administrator client computer device 120 can receive widget configuration prompt data specifying the output at area 516 at block 1302. An administrator user using administrator user interface 500 can use area 516 to make a selection of a candidate dataset property which can be a filtered and reduced set of candidate dataset properties, indicated in area 516. Administrator client computer device 120 can send administrator user defined selection data defined using area 516 block 1303.

The widget configuration selection data specified by a user using administrator user interface 500 can be received by manager system 110 at block 1107. Manager system 110 can proceed to block 1108 to record the mapping performed by manager system 110 running mapping process 114 whether the mapping is automated or guided.

Figure 8:
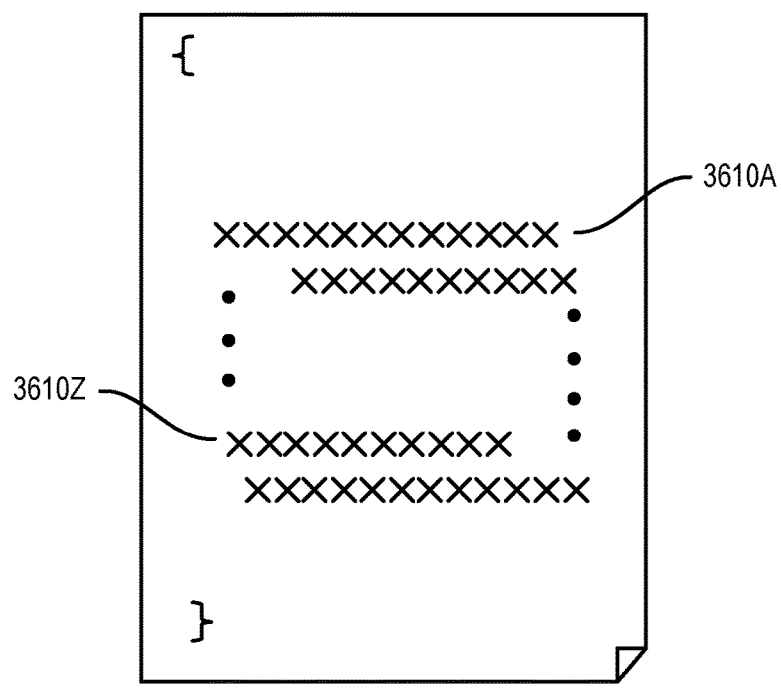
FIG. 8 depicts a text based file having metadata specifying and describing dataset properties according to one embodiment.

Further operations of manager system 110 running mapping process 114 including running trends analysis process 115 are described in reference to the flowchart of FIG. 8. At block 8002, manager system 110 can obtain widget and dataset selections of an administrator user, e.g. as set forth in reference to block 1103 of the flowchart of FIG. 4. Based on the selections made by an administrator user, manager system 110 at block 8006 can perform a call to data repository 112 to return data from selected widgets stored in widgets area 2121 and a call to enterprise system 140 to return data specifying properties of a selected dataset. The return data can include metadata that specifies information on widget attributes and dataset properties.

Figure 7:
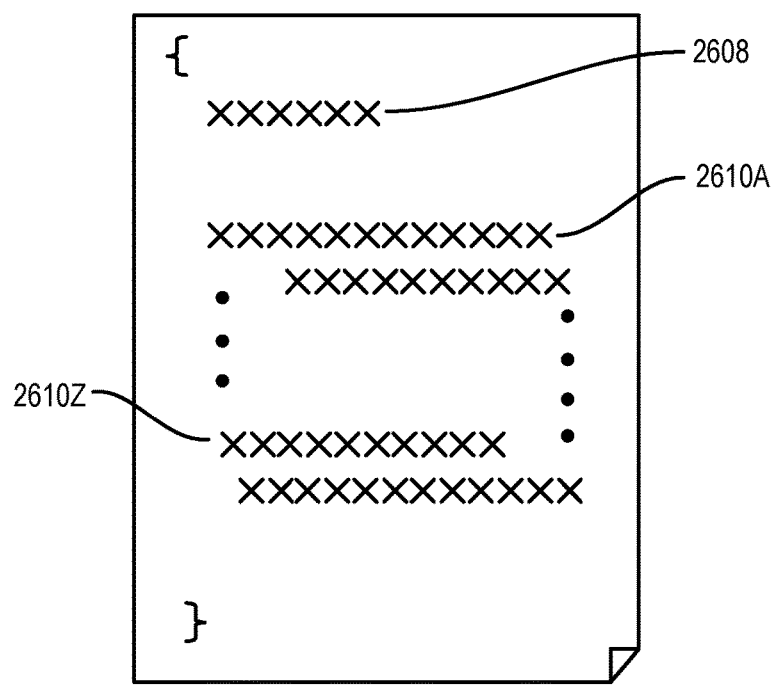
FIG. 7 depicts a text based file having metadata specifying and describing widget attributes according to one embodiment.

FIG. 7 depicts returned data resulting from a data call for a selected widget. Return data can include metadata 2608 specifying a title of the widget and metadata 2610A-2610Z which is metadata specifying and describing attributes of a widget. The data call for widget attribute data at block 8006 can return metadata in a text based file e.g. in JSON file format as depicted in the example of Table A.

TABLE A

```
[ {
  'id': MARKERLAT,
  'name': nls.MAP_MARKER_LAT,
  'description': nls MAP_MARKER_LAT_DESC,
  "valueTypes": ["number"]
},
{
  'id': MARKERLON,
  'name': nls.MAP_MARKER_LON,
  'description': nls MAP_MARKER_LON_DESC,
  "valueTypes": ["number"]
},
{
  'id': MARKERSTATUS,
  'name': nls.MAP_MARKER_STATUS,
  'description': nls.MAP_MARKER_STATUS_DESC,
  "valueTypes": ["status","string"]
}
]
```

FIG. 8 depicts returned data resulting from a data call to enterprise system 140 for a selected dataset. In one embodiment, each IT management service of IT management services 1406A-1406Z can include a Representational State Transfer (REST) application program interface (API). Manager system 110 at block 8006 can send a data call for dataset data to the REST API for the IT management service mapping to the selected dataset. Returned data can include metadata 3610A-3610Z which is metadata specifying respective properties of the selected dataset. The data call for dataset data at block 8006 can return metadata in a JSON file for example.

An illustrative call for dataset data to a REST API of an IT management service can have the form:

GET/providers/{providerId}/[datasources/{datasourceId}]/datasets/{datasetId}/columns  (1)

An illustrative response can be provided with a text based file, e.g. in JSON as depicted in Table B.

TABLE B

```
"items": [
{
  "description": "Description of the item",
  "filter": { },
  "filterable": true,
  "hidden": false,
  "id": "DESCRIPTION",
  "label": "Description",
  "searchable": true,
  "sortable": true,
  "uri":
  "\/providers\/DEMO\/datasets\/DEMO\/columns\/DESCRI
  PTION",
  "valueType": "string",
  "width": -1
},
```

TABLE B-continued

```
{
  "description": "Primary Status",
  "filter": {
  "possibleValues": [
  {
    "image":
    "[widget]\/resources\/common_assets\/status_icons\/PNG\
    /16x16\/st16_fatal_24.png",
    "label": "Unrecoverable",
    "value": -1
  },
  {
    "image":
    "[widget]\/resources\/common_assets\/status_icons\/PNG\
    /16x16\/st16_critical_24.png",
    "label": "Critical",
    "value": 0
  },
  {
    "image":
    "[widget]\/resources\/common_assets\/status_icons\/PNG\
    /16x16\/ac16_WarningMinor_24.png",
    "label": "Warning",
    "value": 1
  },
  {
    "image":
    "[widget]\/resources\/common_assets\/status_icons\/PNG\
    /16x16\/st16_informational_24.png",
    "label": "Information",
    "value": 3
  },
  {
    "image":
    "[widget]\/resources\/common_assets\/status_icons\/PNG\
    /16x16\/st16_WarningMajor_24.png",
    "label": "Service",
    "value": 4
  },
  {
    "image":
    "[widget]\/resources\/common_assetsVstatus_icons\/PNG\
    /16x16\/st16_unknown_24.png",
    "label": "Unknown",
    "value": 5
  },
  {
    "image":
    "[widget]\/resourcesVcommon_assetsVstatus_icons\/PNG\
    /16x16\/st16_normal_24.png",
    "label": "OK",
    "value": 6
  }
  ],
  "values": [
  ]
  },
  "filterable": true,
  "hidden": false,
  "id": "STATUS",
  "label": "Status",
  "searchable": true,
  "sortable": true,
  "uri":
  "\/providers\/DEMO\/datasets\/DEMO\/columns\/STATU
  S",
  "valueType": "status",
  "width": -1
},
{
  "description": null,
  "filter": {
  "possibleValues": [
  {
    "label": "zero",
    "value": 0
  },
```

TABLE B-continued

```
{
"label": "one",
"value": 1
},
{
"label": "two","value": 2
},
{
"label": "three",
"value": 3
},
{
"label": "four",
"value": 4
}
],
"values": [
]
},
"filterable": true,
"hidden": false,
"id": "ENUM",
"label": "Enumeration",
"searchable": true,
"sortable": true,
"uri":
"\/providers\/DEMO\/datasets\/DEMO\/columns\/ENUM"
,
"valueType": "enum",
"width": -1
}
]
```

At block 8010, manager system 110 can initiate processing performed for each attribute of a selected visualization widget. At block 8014, manager system 110 can perform examining one or more of (a) data type, (b) dataset property names and/or attribute property names or (c) context. Exemplary processing at block 8014 can include, in order in one embodiment: (i) Check dataset property and widget attribute datatype metadata, e.g.: Numeric, Date, String etc. and short lists matching ones for widget attribute; (ii) Check dataset property name and widget attribute name metadata, e.g.: Check column Id/Name/Label for associated terms, e.g.: Date, Lat/Long etc.; (iii) Check other context metadata provided for describing the dataset and/or widget, e.g. Check hints in description/metadata which could assist in assignment and knowing more about data and use that information to create associations. For example, widget title is "CPU Usage" so if there are two dataset fields called CPU_Usage and Memory_Usage, then most likely user is trying to visualize the CPU information and hence system would select CPU_Usage. Manager system 110 can activate NLP process 113 to perform examining at block 8014 e.g. to perform a selection based on topic identification.

At block 8010, manager system 110 can determine whether the processing at block 8014 resulted in a single candidate dataset property being selected. If so, manager system 110 can proceed to block 8026 to present the single selected dataset property for override selection by an administrator user. Where examining at block 8014 has reduced a number of candidate selections to a number greater than 1, manager system 110 at block 8018 can proceed to block 8022. At block 8022, manager system 110 can perform trends analysis. Performance at block 8022 can include activation of trends analysis process 115. Performing examining history data to identify a candidate dataset property can include examining of prior matches performed by system 100, e.g. manually or user guided between a certain widget attribute and a certain dataset property. Past history data can be used for providing fast matching of widget attributes to dataset properties. For performing trends analysis using history data of history area 2123, manager system 110 can employ a scoring function that scores for each attribute of a widget, a candidate property with respect to the attribute. As set forth herein, a given attribute of a widget can have matched thereto, any one of a plurality of candidate properties of a certain dataset. Manager system 110 at block 8022 can examine the history of prior matches for each of the candidate properties. Using a scoring function, it can be seen that properties that have never previously been matched to a given widget attribute or which have been seldomly matched can be given relatively lower scores and that dataset properties frequently matched to a given widget attribute can be given relatively higher scores.

Manager system 110 in one embodiment can rank and prioritize candidate dataset properties in the order of their scores and can use thresholding to remove a subset of the candidate properties from a finalized and reduced set of candidate properties. A scoring function used by manager system 110 for scoring a relevance of a given candidate dataset property to a certain widget attribute is set forth in the equation of (2).

$$S = F1\,W1 + F2\,W2 + F3\,W3 + F4\,W4 + F5\,W5 + F6\,W6 + F7\,W7 + F8\,W8 + F9\,W9 \qquad (2)$$

Where S is the scoring function, F1-F9 are factors and W1-W9 are weights associated with the various factors. In the described example, factor F1 can be a number of matches factor. For example, for each given candidate dataset property that dataset property will have been matched by system 100 zero to N previous times. According to factor F1 a candidate dataset property is given a higher value, where history area 2123 indicates a higher number of previous matches of the certain dataset property to the widget attribute being subject to scoring. Regarding factor F2, factor F2 can be a match percentage factor. For example, for a given widget attribute, that widget attribute can be matched to the current dataset property being subject to scoring X number of times but may also have been matched to another dataset property a number of times equal to Y. Factor F2 is given a higher value in the described scenario where the percentage of total matches observed for a given widget attribute involving the current dataset property is higher. Factors F3 and F4 can be factors based on the manner in which a prior match of the current attribute to the current factor was made. Manager system 110 can specify a value under factor F3 proportional to percentage of matches involving the current attribute and dataset property occurred as a result of a guided manually implemented match made pursuant to a menu selection of a filtered and reduced candidate properties set displayed on an administrator user interface 500. According to factor F4, manager system 110 can specify a value under factor F4 proportional to a percentage of matches observed involving the current widget attribute and dataset property occurred as a result of an automated guided selected match made pursuant to an override selection of an administrator user using an administrator user interface 500. Factor F5 can be a current administrator user factor. Manager system 110 can specify a value to be proportional to the percentage of matches for the widget attribute to the current dataset property having the current administrator associated thereto. Factor F6 is a role factor. Manager system 110 can specify a value for factor F6 to be proportional to the percentage of matches for the widget attribute to the current dataset property having the role of the current administrator associated thereto. Factor F7 is a domain factor. Manager system 110 can specify a value for factor F7 to be proportional to the percentage of matches for the widget attribute to the current dataset property having the domain (e.g. same business or organizational entity) of the current domain associated thereto. Factors F8 and F9 can be success factors. Factor F8 can be a widget setup stability factor. Manager system 110 can apply a higher value under factor F8, where prior observed matches between the current widget attribute and current dataset property are stable over time and not subject to reconfiguration by an administrator user after an initial setup. Factor F9 can be a success factor based on the overall performance of a computer network. For allocating values under factor F9, manager system 110 can examine performance of enterprise system 140 for which a current matching is being performed as well as additional enterprise systems, e.g. enterprise systems 140B-140Z of system 100. For specifying a score under factor F9, manager system 110 can examine the performance of resources of the various enterprise systems 140 and 140B-140Z in which matching was provided between the current widget attribute and the current candidate dataset property. Resource performance metrics for use in providing a score under factor F9 can be provided using one or more of IT management services 1406A-1406Z.

Figure 9:
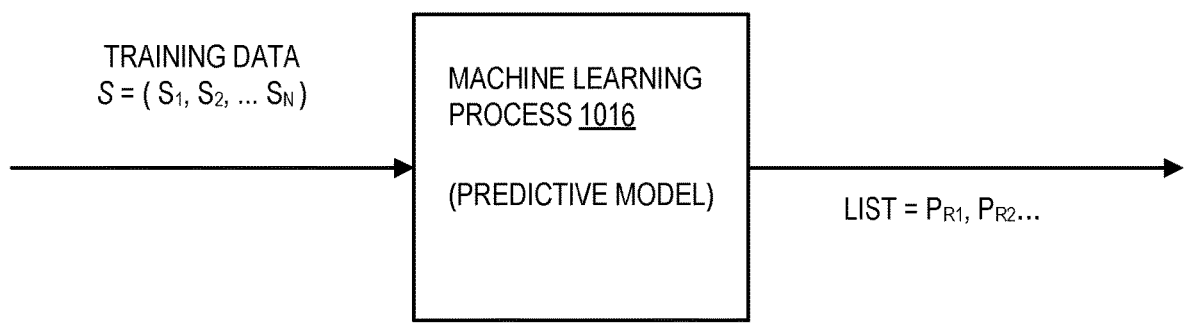
FIG. 9 depicts a predictive model trained by machine learning according to one embodiment.

Regarding factors F1-F9 it is seen that values accorded by manager system 110 according to the various factors will adapt and change over time as data of history area 2123 is updated. Regarding factors F6, F7, and F9, manager system 110 can examine data of history area 2123 received from other enterprise systems, such as enterprise systems 140B-140Z. It will be seen that the described processing involving evaluations of scoring parameters S for candidate dataset properties for matching to a widget attribute can define a machine learning process 1016 of machine learning process 116. As depicted in FIG. 9, the described processing defines a machine learning process 1016 wherein the scoring value vector S=(S1, S2, . . . SN) is applied as training data to a defined predictive model to predict best functioning dataset properties matched to a certain widget attribute. In the machine learning process described the training data can, alternatively stated, be provided by the parameter value pairs associated to the factors used to return the scoring value vector S=(S1, S2, . . . SN). A prioritized list, e.g. ranked by scoring values of candidate dataset properties can be returned as an output of the predictive model. In some embodiments, vector data can include timestamp data which can be used for weighting or discarding of aged data. In the described example the vector S is provided by a set of scoring values returned by determining the value S as set forth in Eq. 1 for each property of a set of candidate properties to match to a certain attribute for a selected visualization widget. Manager system 110 can iteratively send new training data over time, e.g. as new matching data is collected in history area 2123 of data repository 112, and the values of the vector S change. The output of the predictive model described in FIG. 1 can iteratively update over time as new data is collected into history area 2123.

After scoring and ranking various candidate dataset properties, manager system 110 can proceed to block 8024 in accordance with a guided automatic selection scheme herein to present a reduced number of candidate dataset properties for selection by an administrator user on administrator user interface 500, e.g. on area 516 of FIG. 5. Based on the guided selections of the user of manager system 110 subsequent to block 8024 of 8026 can proceed to block 8030 to record a performed mapping of a widget attribute to a dataset property. Blocks 1302, 1303 and 1107 of FIG. 4 refer to processing wherein an administrator user uses administrator user interface 500 to select from reduced set of candidate options or to override a default selection of a widget attribute and dataset property matching by manager system 110.

Figure 6:
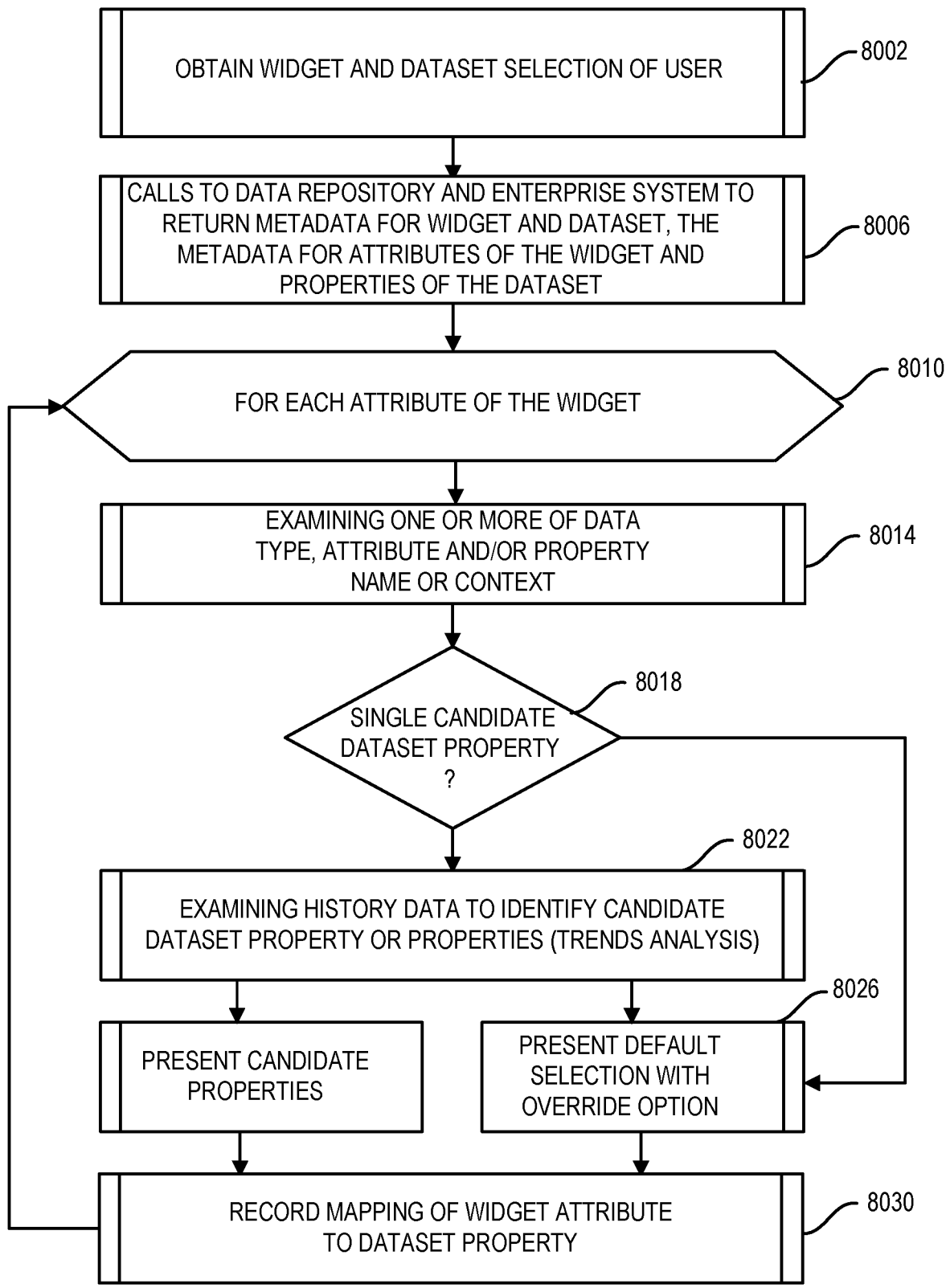
FIG. 6 is a flowchart illustrating a method for performance by a manager system according to one embodiment.

Referring again to the flowchart of FIG. 4, record block 1108 corresponds to record block 8030 of the flowchart of FIG. 6. Recording data on a performed match by manager system 110, e.g. fully automatically or guided automatically can include recording data specifying parameters of the match including metadata that specifies administrator activity context (e.g. fully automatic, guided automatic or fully manually) of a performed match.

Metadata associated recorded data that specifies parameters of a match can include metadata that indicates whether the matching was, e.g. (a) fully automatically performed or (b) performed on a guided automated basis, e.g. by an administrator user selecting from a reduced set of dataset properties or by administrator user performing a manual override of default selected match; or (c) fully manually performed. Metadata associated with matching data can also include such data as an identifier for the administrator user associated to the matching and/or an identifier for the enterprise system associated to the matching. Thus, the metadata for matching records stored in history area 2123 can include information on the administrator activity context of the matching, e.g. fully automated matching or guided automated or fully manual and data on the identifier of the associated administrator user, the role of the administrator user and the enterprise system associated to the matching. A matching performed by manager system 110 can be based on manager system data provided by manager system 110 (e.g. defining a reduced set of menu options or a default selection for matching) and/or administrator user defined data e.g. as entered into administrator user interface 500 to specify a menu selection or an override selection.

Manager system 110 at block 1109 can provide one or more output in response to a matching. The one or more output provided at block 1109 can include e.g. one or more output to provide visualization data. Manager system 110 at block 1109 in one aspect, can send a communication to provide visualization data for display on an administrator user interface 500 (FIG. 5) as is depicted by receive block 4062. Manager system 110 providing one or more output at block 1109 can include manager system 110 sending a patch to address a problem based on the depicted visualization.

Referring to administrator user interface 500 (FIG. 5) area 520, based on the receipt of visualization data at block 4062 can display in area 520 of administrator user interface 500 a visualization in accordance with a selected widget dataset and matching between widget attribute and dataset property. The provided visualization of area 520 can indicate a problem condition with one or more resource 1402A-1402Z of enterprise system 140. In response receipt a communication at block 4062 a selected IT management service of IT management services 1406A-1406Z can send at block 4063 dataset data for receipt and formatting by manager system 110 according to a selected visualization. Manager system 110 can responsively output visualization data for display by administrator client computer device 120 at block 1304.

One or more output provided by manager system 110 at block 1109 can include manager system 110 sending a communication to at least one computer system resource of the enterprise system for correction of the at least one indicated condition. In one embodiment, the communication for correction of an indicated condition can include e.g. a communication to install a selected patch as set forth herein for correction of the indicated condition. In another embodiment, the communication for correction of an indicated condition can include a communication to activate a selected reset of a computer system resource. The resource can be e.g. an application, a computing node, one or more program (e.g. system level or defining an application) and/or one or more component defining a computing node. In one embodiment, the communication for correction of an indicated condition can be a communication to adjust a setting of the management service running on the enterprise system, wherein a monitoring performed by the management service is in dependence on the setting. For example, manager system 110 can send a can send a communication based on an indicted condition of a computer system resource to a REST API of an IT management system performing logging to adjust a logging function performed by the IT management system for logging events of the computer system resource. Manager system 110 can send a communication for correction of an indicated condition in dependence on or independent of any administrator user defined selection data defined using administrator user interface 500.

In one embodiment, in response to an indicated condition an administrator user can use area 530 of administrator user interface 500 to select an appropriate patch from patch menu available in area 532. An administrator user can use area 536 to specify a destination for a selected patch and then patch the selected can be responsively sent by manager system 110 to the selected destination which can specify a particular one or more resource of enterprise system 140. Data indicating patch selections can include e.g. in area 531 runbook data specifying administrator user procedures associated to a selected patch as set forth herein. Using area 530 an administrator can define administrator user selection data and manager system 110 based on the selection data can initiate other communications for correction of an indicated condition of a computer system resource indicated in area 520. Manager system 110 can send other communications for correction of an indicated condition e.g. a communication to reset a computer system resource of resources 1402A-1402Z, e.g. based on administrator user defined selection data defined using area 530. Manager system 110 can send other communications for correction of an indicated condition e.g. to adjust a setting of an IT management service of IT management services 1406A-1406Z such as a data logging setting, e.g. for problem isolation and resolution drill-down from an incident/event in the performance of a root cause analysis (RCA). Manager system 110 can send setting adjustment setting communications for correction of indicated conditions to REST APIs of one or more IT management service of management services. Manager system 110 can send IT management service setting adjustment communications for correction of indicated conditions based on administrator user defined selection data entered by an administrator user defined using area 540 of administrator user interface 500. Manager system 110 in any of the described embodiments involving sending a communication for correction of an indicated condition indicated in area 520 can send the communication independent of any administrator user defined selection data.

Certain embodiments herein may offer various technical computing advantages involving computing advantages to address problems arising in the realm of computer networks. Embodiments herein recognize that with administrator users increasingly working remotely with respect to computer system resources, such administrator users are increasingly using administrator user computer devices that are mobile devices having small screens. Embodiments herein can feature simplified and reduced content user interface control features, and in various embodiments can avoid or use processes involving manual input to enhance an administrator's ability to perform administrative activities with respect to a computer system using an administrator computer device provided by a mobile device having a small screen. Embodiments herein can include small screen mobile computer device user interface features including features to facilitate rapid configuration of condition indicating widgets for use in indicating conditions of computer system resources which conditions can include, e.g. conditions specifying application run time, CPU usage and/or memory utilization. Small screen mobile computer device user interface features can also include features to facilitate corrective action to correct indicated conditions of computer system resources. Machine learning processes can be employed, such as a machine learning processes to automatically and iteratively apply training data to a predictive model that predicts best performing widget attribute and dataset property matches. Machine learning processes can be performed for increased accuracy and for reduction of reliance on rule based criteria and thus, reduced computational overhead. For enhancement of computation accuracies, embodiments can feature computational platforms existing only in the realm of computer networks such as artificial intelligence (AI) platforms and machine learning platforms. Embodiments herein can provide setup of widgets for indicating conditions of a computer system resources, and can include implementations of corrective actions to such conditions. Corrective actions correcting conditions of a computer system resource can include, e.g. software patch installation, resource resets, and/or logging profile activation.

Figure 10:
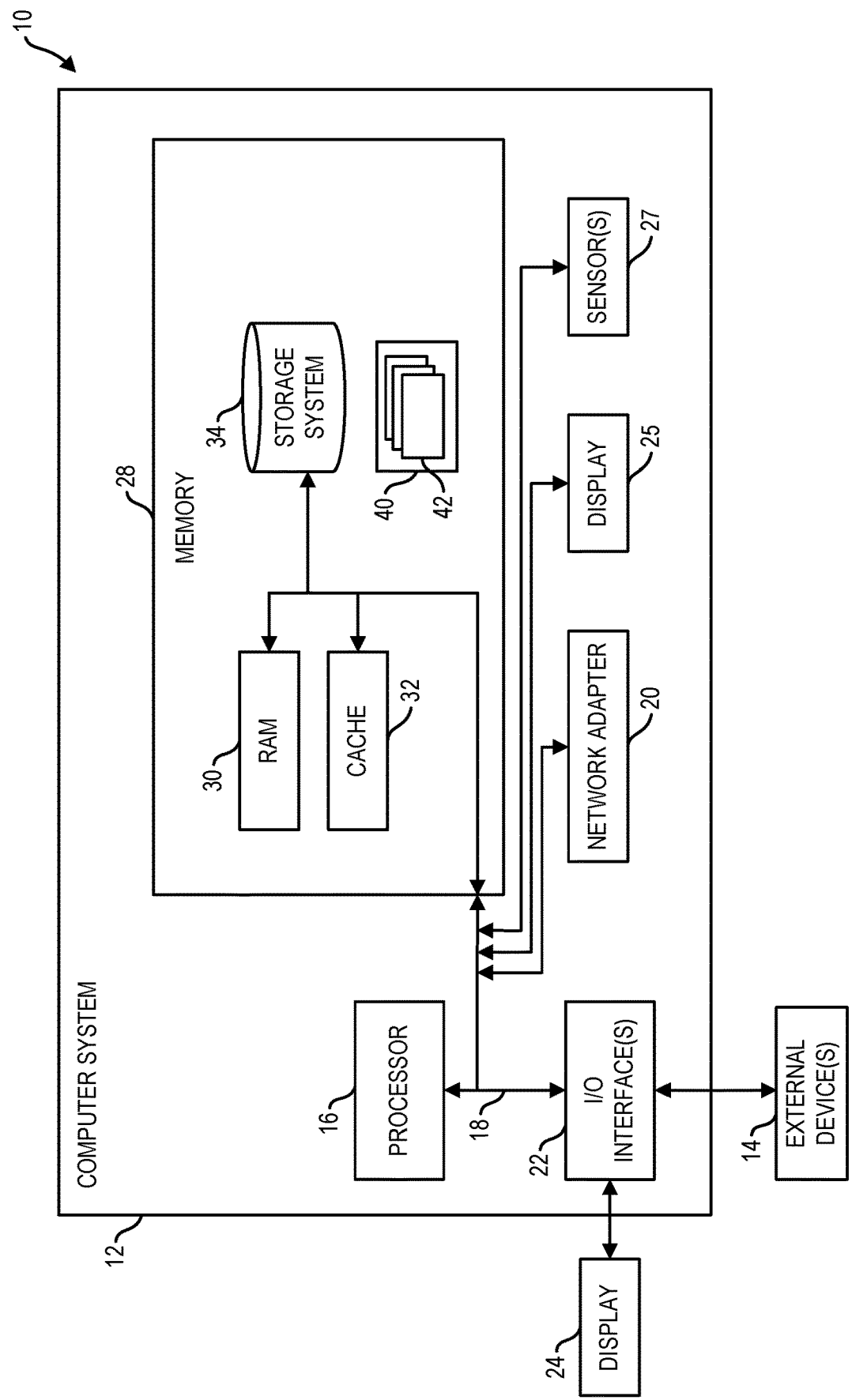
FIG. 10 depicts a computing node according to one embodiment.
Figure 11:
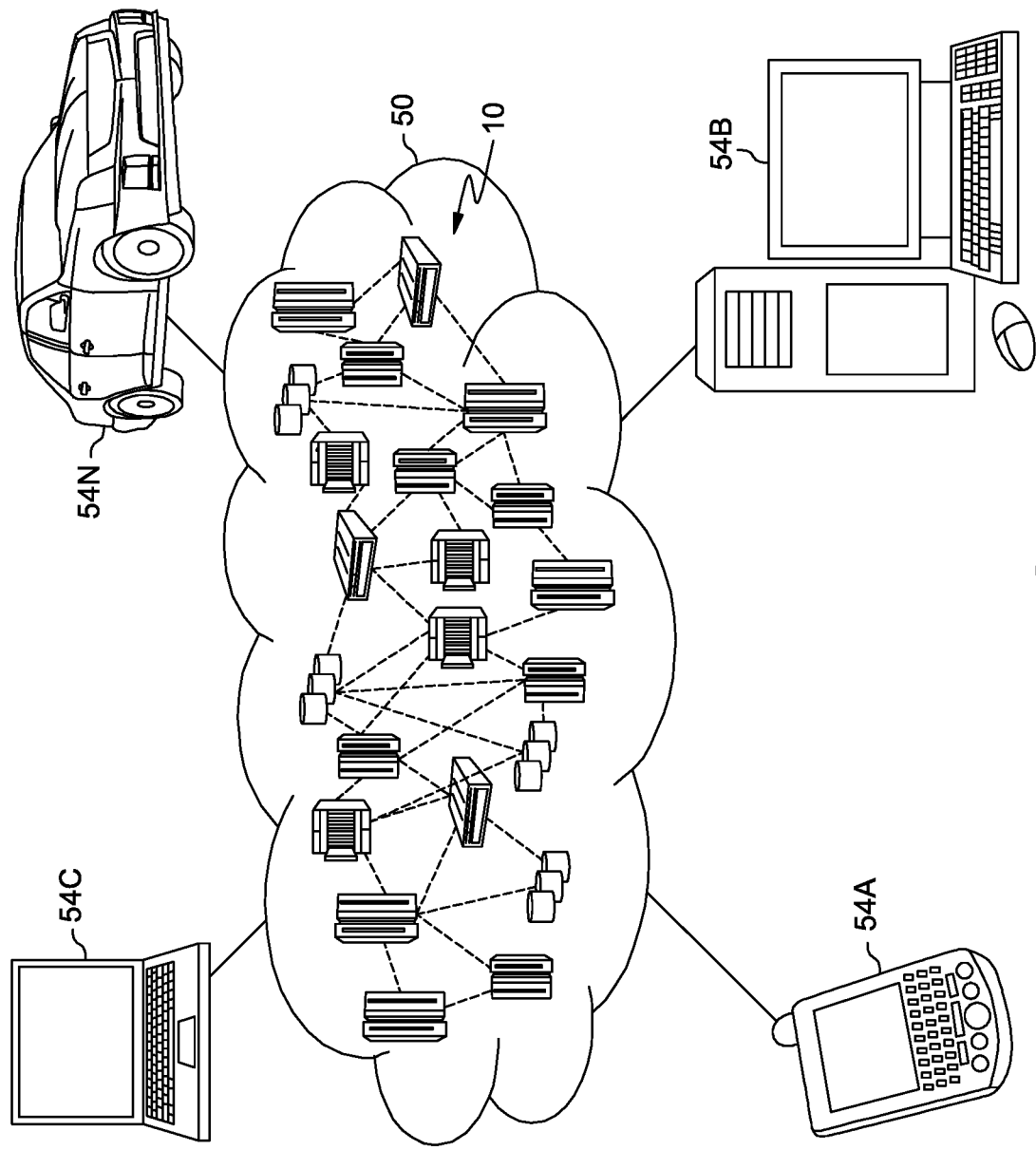
FIG. 11 depicts a cloud computing environment according to one embodiment.
Figure 12:
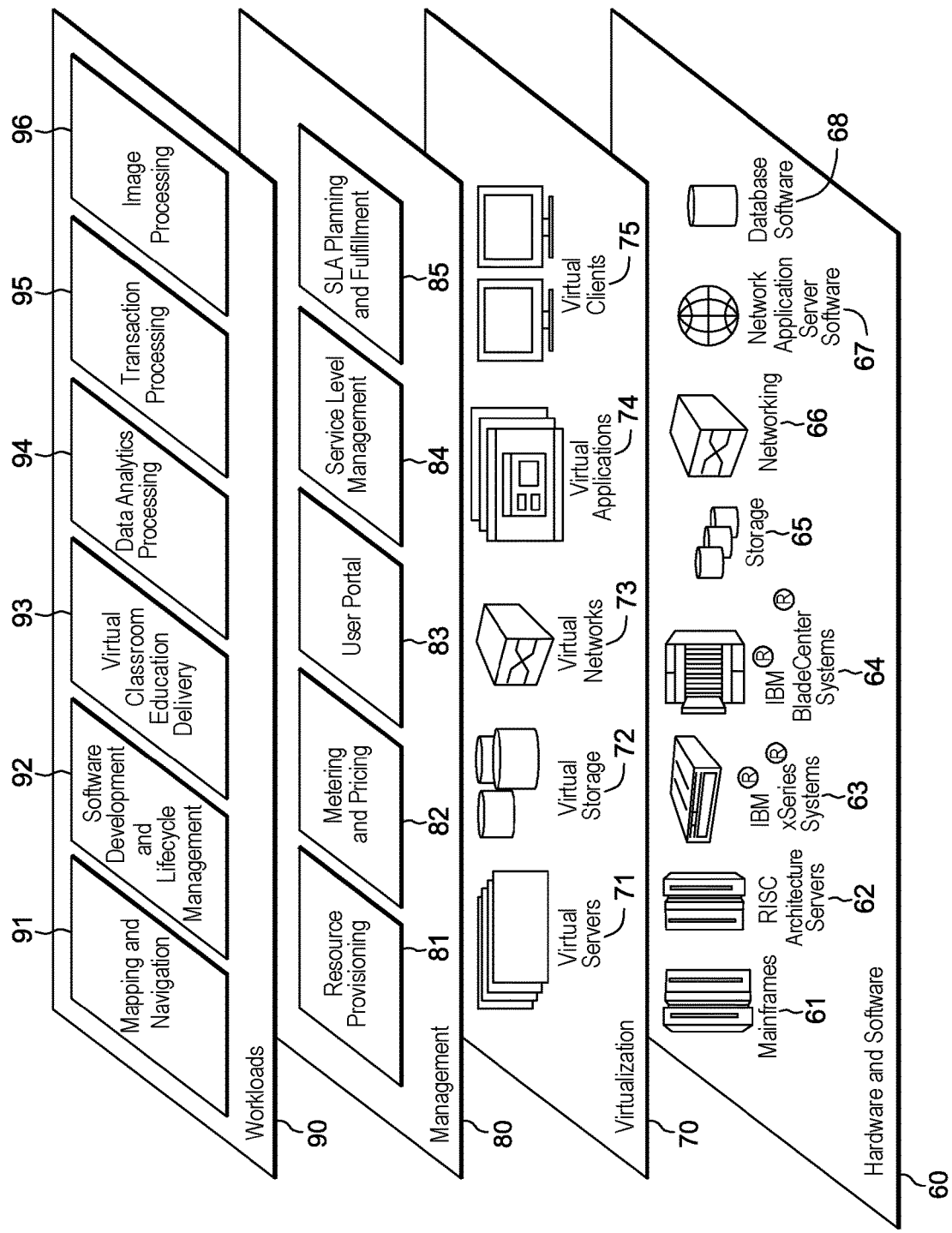
FIG. 12 depicts abstraction model layers according to one embodiment.

FIGS. 10-12 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 10, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 11-12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2 and functions described with reference to method 300 of FIG. 3 and functions described with reference to manager system 110 as set forth in the flowchart of FIG. 4. In one embodiment, administrator client computer device 120 can include one or more computing node 10 and can include one or more program 40 for performing functions described with reference to one or more administrator client computer device 120 as set forth in the flowchart of FIG. 4. In one embodiment, IT management services 1406A-1406Z as depicted in FIG. 4 can run on one or more computing node 10 and can include one or more program 40 for performing functions described with reference to IT management services 1406A-1406Z as set forth in the flowchart of FIG. 4. In one embodiment, resources 1402A-1402Z as depicted in FIG. 4 can run on one or more computing node 10 and can include one or more program 40 for performing functions described with reference to resources 1402A-1402Z as set forth in the flowchart of FIG. 4. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 11 computing node 10 is described as being implemented in a cloud computing environment and accordingly is referred to as a cloud computing node in the context of FIG. 11.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for matching of widget attributes to dataset properties as set forth herein. The processing components 96 can be implemented with use of one or more program 40 described in FIG. 10.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Forms of the term "defined by" herein encompass relationships where an element is partially defined by as well as relationships where an element is entirely defined by. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   obtaining administrator user defined configuration data associating a certain dataset to a certain widget, wherein the certain dataset specifies a plurality of conditions of one or more computer system resource and is provided by a management service running on an enterprise system having the one or more computer system resource;
   examining historical matching data respecting past matches between a widget attribute of the certain widget and properties of the certain dataset;
   performing matching between the widget attribute of the widget and a dataset property of the dataset based on the examining historical matching data respecting past matches between a widget attribute of the certain widget and properties of the certain dataset, and miming the certain widget in response to the performing matching to indicate at least one condition of the plurality of conditions; and
   sending by a computing node a communication for correction of the at least one indicated condition.

2. The method of claim 1, wherein performing matching is based on manually input data entered by an administrator user using a reduced size mobile computer user interface display.

3. The method of claim 1, wherein the performing matching includes filtering candidate dataset properties to reduce a size of a displayed list of candidate dataset properties displayed on a reduced size mobile computer display.

4. The method of claim 1, wherein the performing matching includes applying training data to a machine learning process for training a predictive model that predicts a best performing set of candidate dataset properties.

5. The method of claim 1, wherein the performing matching includes applying training data to a machine learning process for training a predictive model that predicts a best performing set of candidate dataset properties, wherein the training data includes plurality of scoring parameters for scoring a relevance of prospective matches of respective candidate dataset properties of the certain dataset to the widget attribute, each of the scoring parameters including a function of weighted factors, the weighted factors including a factor in dependence on a characteristic of administer user activity associated to a past matching of a candidate dataset property to the widget attribute.

6. The method of claim 1, wherein the performing matching includes applying training data to machine learning process for training a predictive model that predicts a best performing set of candidate dataset properties.

7. The method of claim 1, wherein the performing matching includes using (a) a predictive model to return a reduced set of candidate dataset properties, and (b) administrator user defined selection data specifying a selection of one dataset property from a displayed menu indicating each of the reduced set of candidate dataset properties, the menu indicating each of the reduced set of candidate dataset properties being displayed on a reduced size display screen of a mobile computer device.

8. The method of claim 1, wherein the performing matching includes using (a) a predictive model to return a reduced set of candidate dataset properties, and (b) administrator user defined selection data specifying a selection of one dataset property from a displayed menu indicating each of the reduced set of candidate dataset properties, the menu indicating each of the reduced set of candidate dataset properties being displayed on a reduced size display screen of a mobile computer device, wherein the predictive model is trained using training data provided by plurality of scoring parameters for scoring a relevance prospective matches of respective candidate dataset properties of the certain dataset to the widget attribute, each of the scoring parameters including a function of weighted factors, the weighted factors including a factor in dependence on a characteristic of administer user activity associated to a past matching of a candidate dataset property to the widget attribute.

9. The method of claim 1, wherein the sending by a computing node a communication to at least one computer system resource of the enterprise system for correction of the at least one indicated condition includes sending a patch to a computer system resource of the one or more computer system resource.

10. The method of claim 1, wherein the sending by a computing node a communication to at least one computer system resource of the enterprise system for correction of the at least one indicated condition includes sending a communication to reset a computer system resource of the one or more computer system resource.

11. The method of claim 1, wherein the sending by a computing node a communication to at least one computer system resource of the enterprise system for correction of the at least one indicated condition includes sending a communication to adjust a setting of the management service running on the enterprise system, wherein a monitoring performed by the management service is in dependence on the setting.

12. The method of claim 1, wherein examining historical matching data respecting past matches between a widget attribute of the certain widget and properties of the certain dataset includes providing a scoring parameter for a candidate dataset for matching to the widget attribute, wherein the providing a scoring parameter includes applying a function comprising weighted factors.

13. The method of claim 1, wherein examining historical matching data respecting past matches between a widget attribute of the certain widget and properties of the certain dataset includes providing a scoring parameter for a certain candidate dataset property for matching to the widget attribute, wherein the providing a scoring parameter includes applying a function comprising a set of weighted factors, wherein the set of weighted factors includes a number of matches factor that specifies a number of times that the certain candidate dataset property has been matched to the widget attribute, wherein the set of weighted factors includes a percentage of matches factor that specifies a percentages of past matches of the widget attribute that are matches to the certain candidate dataset property, wherein the set of weighted factors includes a factor in dependence on a percentage of past matches involving the widget attribute and the certain candidate dataset property being made based on an administrator user selection of a reduced set of candidate datasets, wherein the set of weighted factors includes a factor in dependence on a percentage of past matches involving the widget attribute and the certain candidate dataset property being made based on an administrator user overriding a default selection of dataset, wherein the set of weighted factors includes a factor in dependence on a number of past matches between the widget attribute and the certain dataset property involving a current administrator user, wherein the set of weighted factors includes a factor in dependence on a number of past matches between the widget attribute and the certain dataset involving administrator users having roles in common with the current administrator user, wherein past matches between the widget attribute and the certain candidate dataset property involve the enterprise system and external enterprise systems, and wherein the set of weighted factors includes a domain factor in dependence on a percentage of past matches between the widget attribute and the certain candidate dataset property involving the enterprise system, and wherein the set of weighted factors includes a success factor in dependence on a result of monitoring of performance of past matches involving the widget attribute and the certain candidate dataset property.

14. The method of claim 1, wherein examining historical matching data respecting past matches between a widget attribute of the certain widget and properties of the certain dataset includes providing a scoring parameter for a certain candidate dataset property for matching to the widget attribute, wherein the providing a scoring parameter includes applying a function comprising a set of weighted factors, wherein the set of weighted factors includes a number of matches factor that specifies a number of times that the certain candidate dataset property has been matched to the widget attribute, wherein the set of weighted factors includes a percentage of matches factor that specifies a percentages of past matches of the widget attribute that are matches to the certain candidate dataset property, wherein the set of weighted factors includes a factor in dependence on a percentage of past matches involving the widget attribute and the certain candidate dataset property being made based on an administrator user selection of a reduced set of candidate datasets.

15. The method of claim 1, wherein the sending by a computing node is independent of any administrator defined selection data for correction of the indicated condition.

16. The method of claim 1, including indicating simultaneously with the indicating the least one condition a plurality of additional conditions, the plurality of additional conditions being specified in datasets external to the certain dataset, the datasets external to the certain dataset mapping to management services external to the management service.

17. The method of claim 1, wherein the sending by a computing node a communication to at least one computer system resource of the enterprise system for correction of the at least one indicated condition includes sending a patch to computer system resource of the one or more computer system resource, sending a communication to reset a computer system resource of the one or more computer system resource, and sending a communication to adjust a setting of the management service running on the enterprise system, wherein a monitoring performed by the management service is in dependence on the setting.

18. The method of claim 1, including indicating simultaneously with the indicating the least one condition a plurality of additional conditions, the plurality of additional conditions being specified in datasets external to the certain datasets, the datasets external to the certain dataset mapping to management system external to the management system, wherein the sending by a computing node a communication to at least one computer system resource of the enterprise system for correction of the at least one indicated condition includes sending a patch to computer system resource of the one or more computer system resource, sending a communication to reset a computer system resource of the one or more computer system resource, and sending a communication to adjust a setting of the management service running on the enterprise system, wherein a monitoring performed by the management service is in dependence on the setting, wherein examining historical matching data respecting past matches between a widget attribute of the certain widget and properties of the certain dataset includes providing a scoring parameter for a certain candidate dataset property for matching to the widget attribute, wherein the providing a scoring parameter includes applying a function comprising a set of weighted factors, wherein the set of weighted factors includes a number of matches factor that specifies a number of times that the certain candidate dataset property has been matched to the widget attribute, wherein the set of weighted factors includes a percentage of matches factor that specifies a percentages of past matches of the widget attribute that are matches to the certain candidate dataset property, wherein the set of weighted factors includes a factor in dependence on a percentage of past matches involving the widget attribute and the certain candidate dataset property being made based on an administrator user selection of a reduced set of candidate datasets, wherein the set of weighted factors includes a factor in dependence on a percentage of past matches involving the widget attribute and the certain candidate dataset property being made based on an administrator user overriding a default selection of dataset, wherein the set of weighted factors includes a factor in dependence on a number of past matches between the widget attribute and the certain dataset property involving a current administrator user, wherein the set of weighted factors includes a factor in dependence on a number of past matches between the widget attribute and the certain dataset involving administrator users having roles in common with the current administrator user, wherein past matches between the widget attribute and the certain candidate dataset property involve the enterprise system and external enterprise systems, and wherein the set of weighted factors includes a domain factor in dependence on a percentage of past matches between the widget attribute and the certain candidate dataset property involving the enterprise system, and wherein the set of weighted factors includes a success factor in dependence on a result of monitoring of performance of past matches involving the widget attribute and the certain candidate dataset property.

19. A computer program product comprising:

A computer readable storage medium readable by one or more processing circuit and storing instructions for execution by one or more processor for performing a method comprising:

obtaining administrator user defined configuration data associating a certain dataset to a certain widget, wherein the certain dataset specifies a plurality of conditions of one or more computer system resource and is provided by a management service running on an enterprise system having the one or more computer system resource;

examining historical matching data respecting past matches between a widget attribute of the certain widget and properties of the certain dataset;

performing matching between the widget attribute of the widget and a dataset property of the dataset based on the examining historical matching data respecting past matches between a widget attribute of the certain widget and properties of the certain dataset, and running the certain widget in response to the performing matching to indicate at least one condition of the plurality of conditions; and sending by a computing node a communication for correction of the at least one indicated condition.

20. A system comprising:

a memory;

at least one processor in communication with the memory; and program instructions executable by one or more processor via the memory to perform a method comprising:

obtaining administrator user defined configuration data associating a certain dataset to a certain widget, wherein the certain dataset specifies a plurality of conditions of one or more computer system resource and is provided by a management service running on an enterprise system having the one or more computer system resource;

examining historical matching data respecting past matches between a widget attribute of the certain widget and properties of the certain dataset;

performing matching between the widget attribute of the widget and a dataset property of the dataset based on the examining historical matching data respecting past matches between a widget attribute of the certain widget and properties of the certain dataset, and running the certain widget in response to the performing matching to indicate at least one condition of the plurality of conditions; and sending by a computing node a communication for correction of the at least one indicated condition.

* * * * *